(12) United States Patent
Yuan

(10) Patent No.: US 6,361,058 B1
(45) Date of Patent: Mar. 26, 2002

(54) PLAYCART MOVABLE WITH HANDS

(76) Inventor: Shih-Hwa Yuan, 1F, No. 4, Yung Chih Street, Ying Ko Chen, Taipei Hsien (TW)

( * ) Notice: Subject to any disclaimer, the term of this patent is extended or adjusted under 35 U.S.C. 154(b) by 0 days.

(21) Appl. No.: 09/799,598

(22) Filed: Mar. 7, 2001

(51) Int. Cl.⁷ .............................................. B62M 1/14
(52) U.S. Cl. .................. 280/242.1; 280/249; 280/288.1
(58) Field of Search ........................... 280/242.1, 249, 280/250, 288.1, 47.34, 47.38, 47.4, 47.41; 74/543, 545, 557

(56) References Cited

U.S. PATENT DOCUMENTS

| | | | | |
|---|---|---|---|---|
| 2,699,339 A | * | 1/1955 | Benstein .................. | 280/47.34 |
| D235,217 S | * | 5/1975 | Lohr ...................... | 280/242.1 |
| 4,066,273 A | * | 1/1978 | Lohr .......................... | 280/211 |
| 4,655,470 A | * | 4/1987 | Lin ............................ | 280/211 |
| 5,562,300 A | * | 10/1996 | Nelson ..................... | 280/655.1 |
| 5,853,184 A | * | 12/1998 | Lofgren et al. .......... | 280/242.1 |
| 6,070,894 A | * | 6/2000 | Augsperger ................. | 280/249 |
| 6,105,986 A | * | 8/2000 | Franks et al. ............... | 280/250 |
| 6,276,703 B1 | * | 8/2001 | Caldwell .................. | 280/242.1 |

\* cited by examiner

*Primary Examiner*—Avraham H. Lerner
(74) *Attorney, Agent, or Firm*—Rosenberg, Klein & Lee

(57) ABSTRACT

A playcart movable with hands has two wheel supports each has a side wheel fitted onto it. The wheel supports are each connected to a connecting plate with two pins. The connecting plates are each connected to one of two bent ends of a front support member, and can be relocated on the front support member to change a width of the playcart for users of various bodily sizes. A main support member connected with a seat member is separably secured to the front member; the seat member can be relocated on the main support to change a length of the playcart. The wheel supports each can be pivoted inwards to fold the playcart for easy storage when one of the pins is removed.

6 Claims, 6 Drawing Sheets

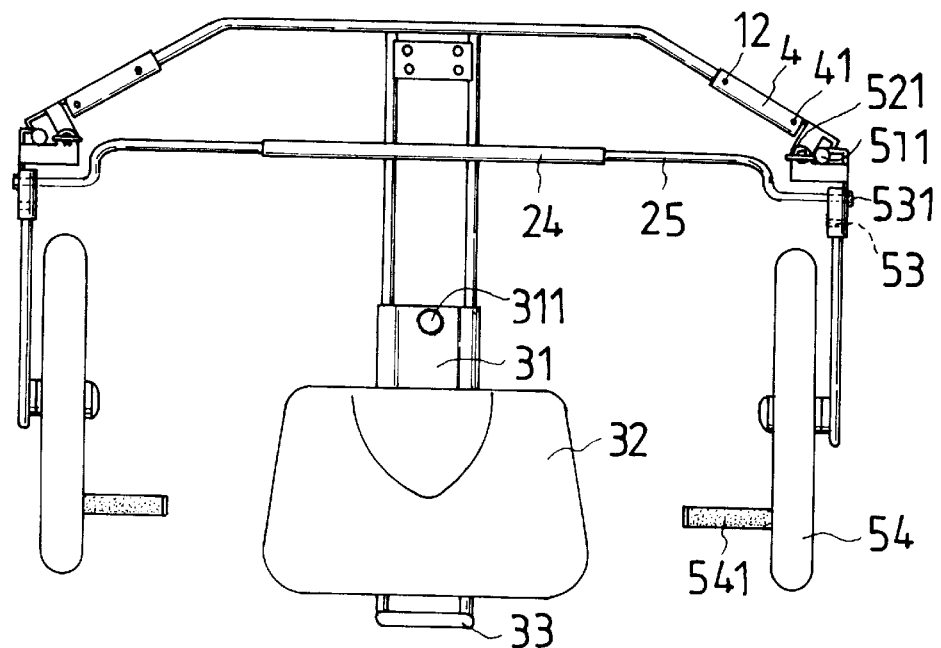
F I G. 5
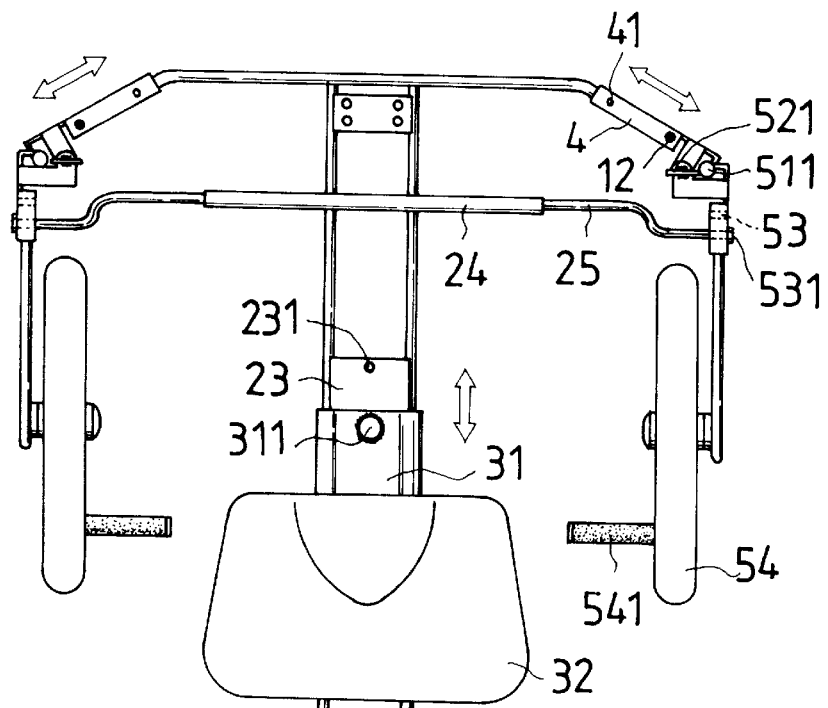
F I G. 6

PLAYCART MOVABLE WITH HANDS

BACKGROUND OF THE INVENTION

The present invention relates to a playcart, and particularly to one which can be moved along by means of pushing a pair of handles attached to the side wheels.

Referring to FIG. 7, a conventional playcart 6 movable with hands has a frame 61, two side wheels 62, handles 63, a base 64, a footrest 67 and an auxiliary wheel 66.

The frame 61 is made of a metallic bar bent into a substantially circular shape; two ends of the metallic bar are firmly connected. The side wheels 62 are fitted to two sides of the frame 61. The handles 63 are each secured to an inner side of a respective one of the wheels 62 between the center and the edge of the wheel 62.

The base 64 is connected to the frame 61, and has a seat 65 at the rear part. The auxiliary wheel 66 is disposed at the rear portion of the frame 61. The footrest 67 is disposed at the front part of the base 64.

The playcart 6 can be moved along by a user who sits on the seat 65, and pivots the handles 63 on the axle of the wheels 62; the user can put his feet on the footrests 67 while riding on the playcart.

However, the conventional playcart is found to have disadvantages as follows:

1. The frame is made of a single bar bent into circular shape so the size can't be adjusted for users of different bodily sizes, i.e. a family has to buy several playcarts of different sizes in order for all members of the family to be able to enjoy riding on the playcart.

2. The playcart can't be folded into a smaller size for easy storage when not in use.

SUMMARY OF THE INVENTION

Therefore, it is a main object of the present invention to provide a playcart movable with hands which can be adjusted in respect of size in order to be suitable for users of various bodily sizes, and can be folded when not in use.

The playcart of the present invention includes a front support member, a main support member, two connecting plates, two wheel supports and a seat member.

The front support member has two end portions bent rearwards; the bent end portions each has a respective one of the connecting plates pivoted to connecting buttons thereof; the connecting plates having several pairs of connecting holes for the buttons can be relocated on the connecting buttons in order to adjust the width of the playcart.

The main support member connected to the front support member with locating rods passed into locating tubes of the front member; the locating rods have depressable buttons engaging connecting holes of the locating tubes such that the locating rods is separable from the locating tubes by means of depressing the buttons.

The wheel supports each has a side wheel fitted onto it, and is connected to a respective one of the connecting plates with two pins such that the wheel supports can be pivoted on the connecting plates to fold the playcart when one of the pins is removed. The side wheels each has a handle projecting from an inner side between a center and an edge.

The seat member is connected to a rear end portion of the main support member by means of a bolt, and can be adjusted in position by means of relocating the bolt to other ones of the screw holes of the main support member.

The main support member further has a front wheel, and the seat member has a rear wheel fitted to the bottom. The playcart can be moved along by a user sitting on the seat member and pivoting the hands on the wheel axles with his hands. The playcart can be folded to a smaller size by pivoting the wheel supports on the pins. And, the seat member and the main support member can be removed from the support member for easy storage when the playcart is not used.

BRIEF DESCRIPTION OF THE DRAWINGS

This invention will be better understood by referring to the accompanying drawings, wherein:

FIG. 5 is a top view of the playcart of the present invention.

FIG. 6 is a view of the playcart of the present invention under the adjustment movement.

DETAILED DESCRIPTION OF THE PREFERRED EMBODIMENT

Figure 1:
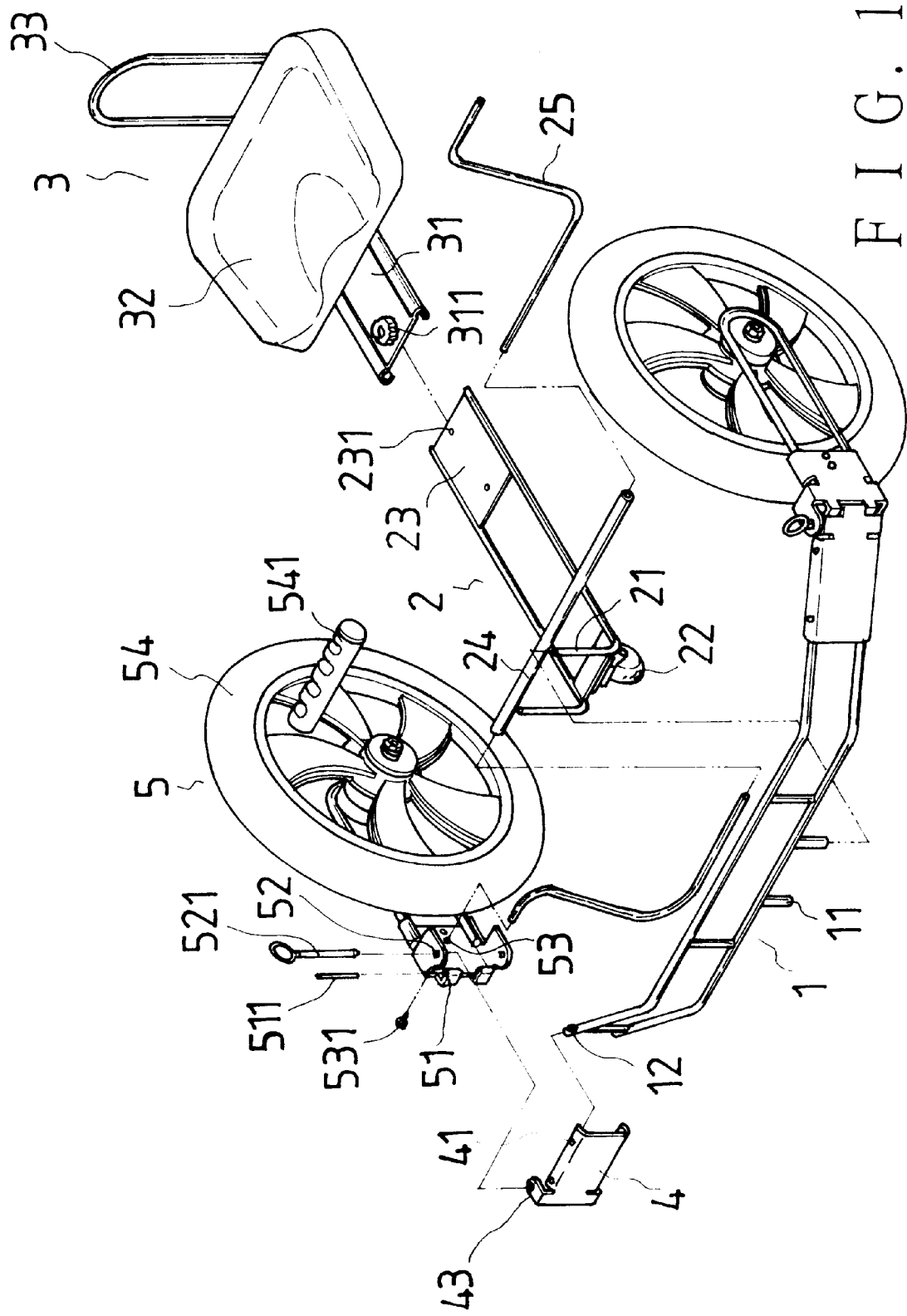
FIG. 1 is an exploded perspective view of the playcart movable with hands according to the present invention.

Referring to FIG. 1, a playcart movable with hands of the present invention includes a front support member 1, a main support member 2, a seat member 3, two wheel supports 5, two side wheels 54 and two connecting plates 4.

The front support member 1 can be made of metal bars of an elongated metal plate, and has two bent end portions. The front support member 1 further has several locating tubes 11 on a lower side, and several pairs of opposing connecting buttons 12 on the end portions; the connecting buttons 12 normally projects from the support member 1, and can be pressed into the support member 1.

Figure 2:
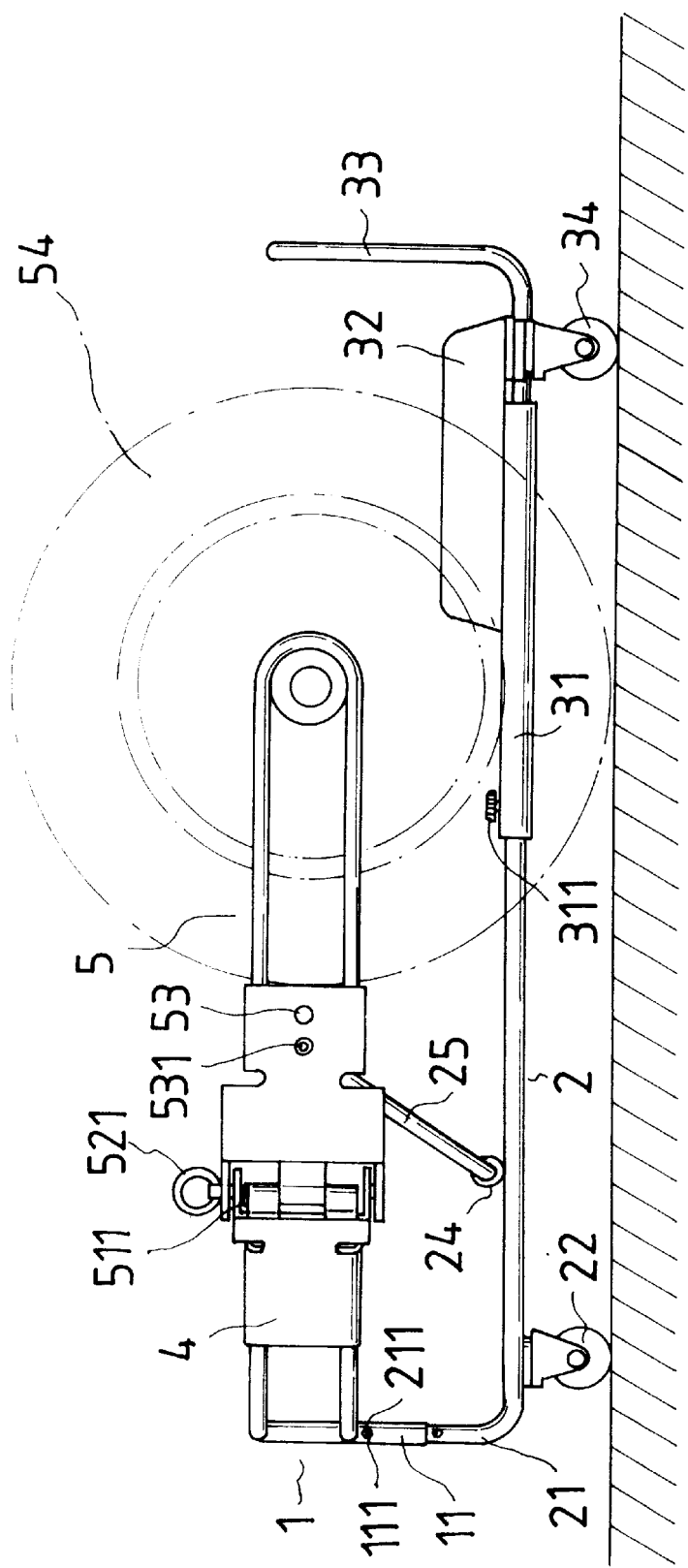
FIG. 2 is a side view of the playcart according to the present invention.

The main support member 2 has a front wheel 22 fitted to a front end, several locating rods 21 projecting from the front end, and a connecting board portion 23 on a rear end portion; the board portion 23 has screw holes 231. The main support member 2 is connected to the front support member 1 with the locating rods 21 fitted into the locating tubes 11 of the front support member 1. Referring to FIG. 2, the locating tubes 11 have connecting holes 111, and the locating rods 21 have depressable connecting buttons 211, which separably engage the connecting holes 111 to secure the locating rods 21 to the locating tubes 11. The depressable connecting buttons 211 normally project from the locating rods 21, and can be depressed for the rods 21 to be separated from the tubes 11. Therefore, the main support member 2 can be easily separated from the front support member 1 if needed.

The seat member 3 has a connecting board 31, a seat 32 disposed on the connecting board 31, and a back 33 connected to a rear end of the seat 32. The connecting board 31 has two bent connecting edges (not numbered), and is connected to the connecting board portion 23 of the main support member 2 by fitting the bent connecting edges onto two edges of the connecting board portion 23; a bolt 311 is screwed through the connecting board 31 and into one of the screw holes 231 of the main support member 2; the position of the seat 32 can be adjusted by connecting the bolt 311 to an appropriate one of the screw holes 231 in order for the playcart to be suitable sizes. A rear wheel 34 is fitted to the rear end of the seat member 3.

Figure 3:
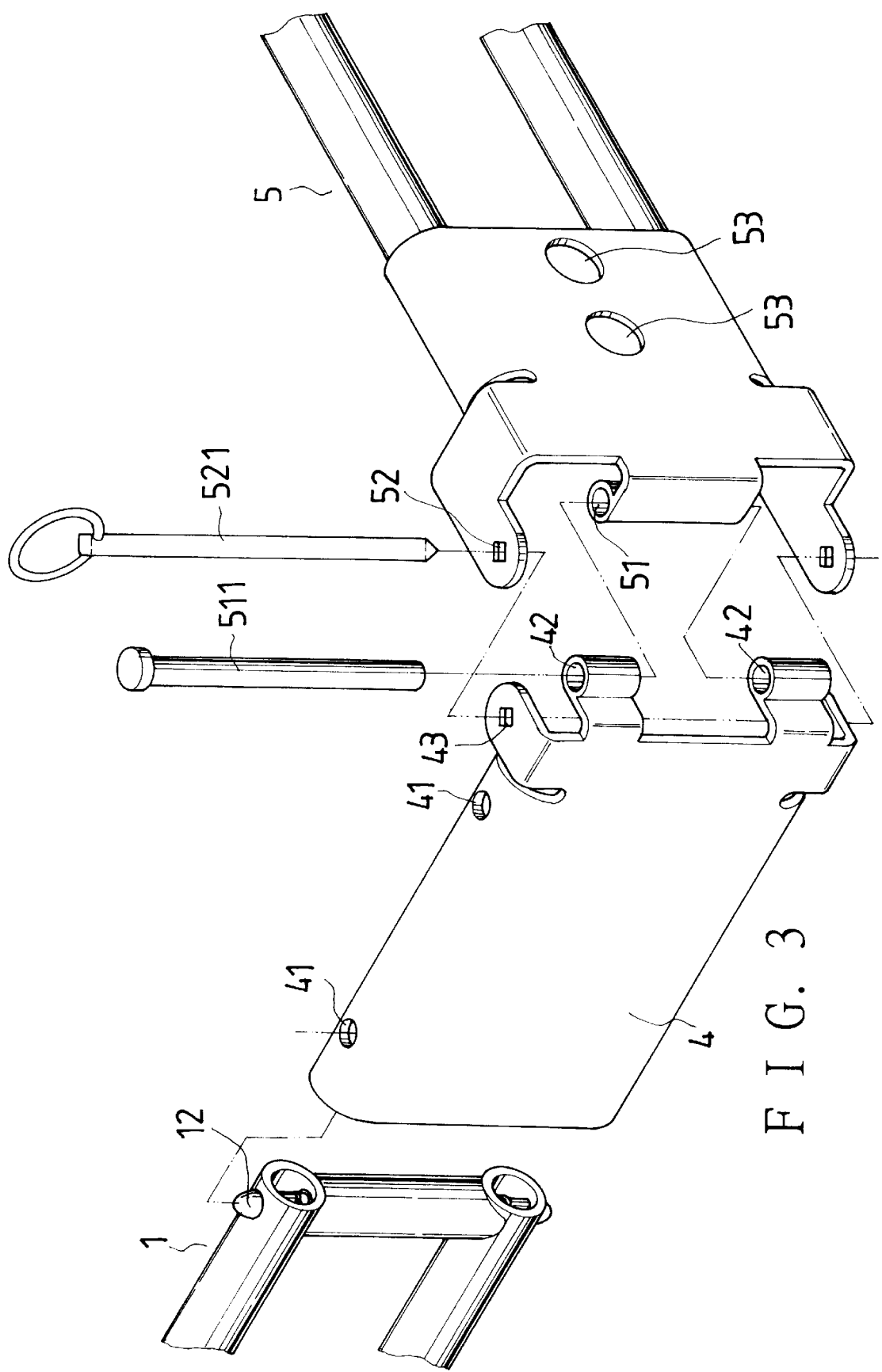
FIG. 3 is a fragmentary exploded perspective view of the playcart of the present invention.
Figure 4:
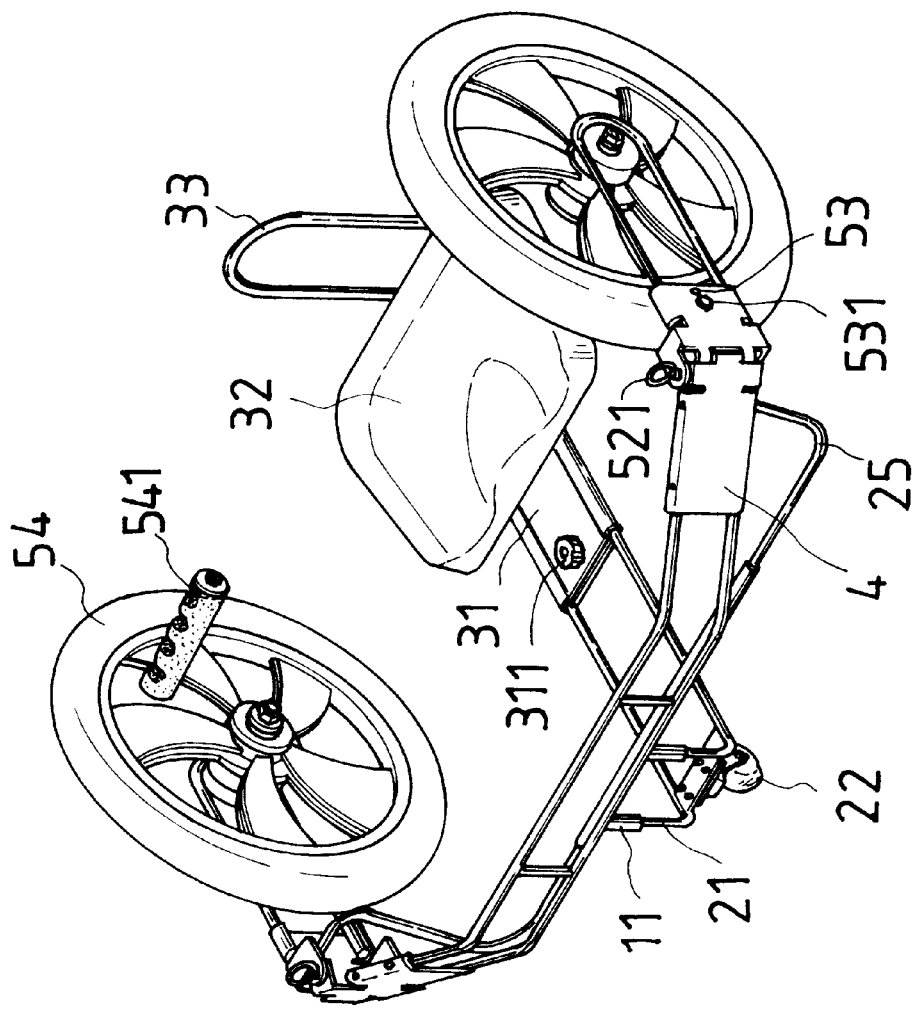
FIG. 4 is a view of the playcart of the present invention.
Figure 7:
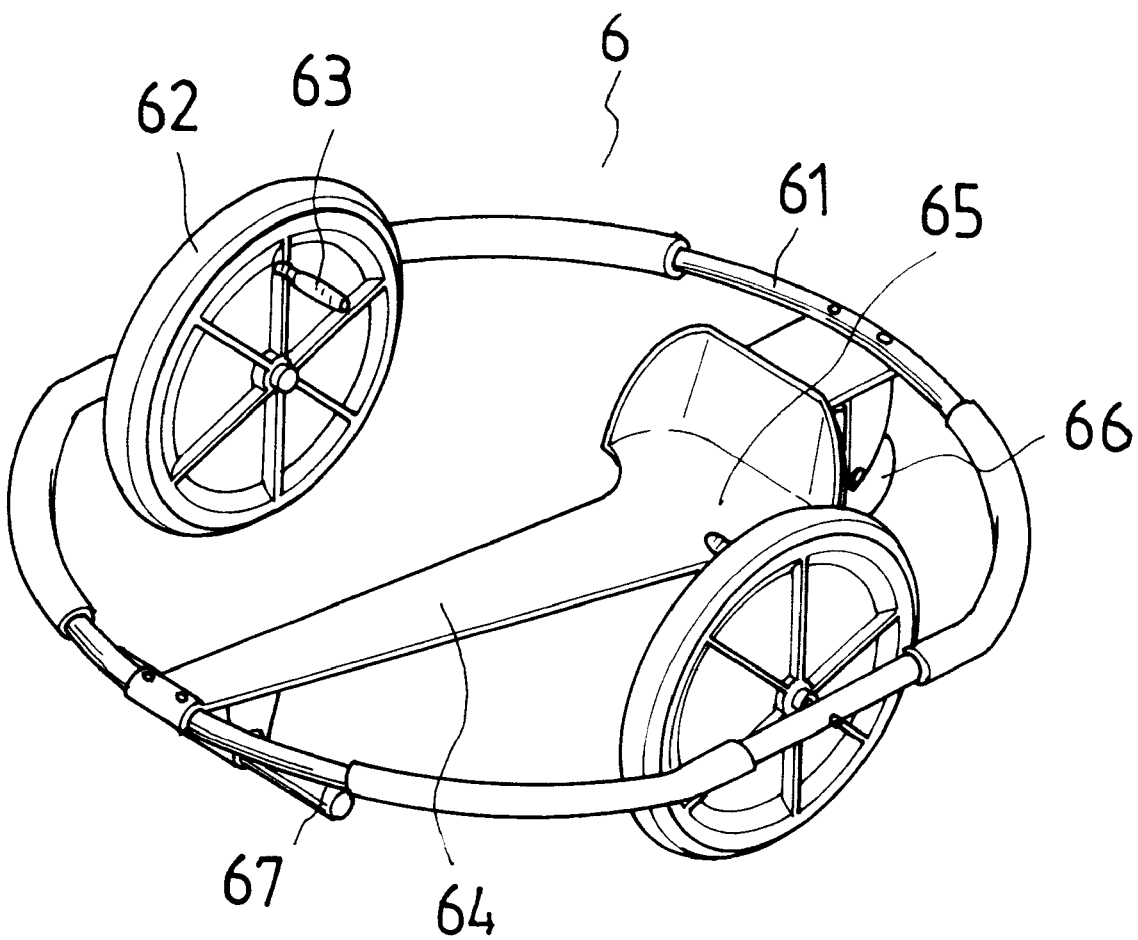
FIG. 7 is a perspective view of the conventional playcart described in the Background.

Referring to FIGS. 1 and 3, the connecting plates 4 each has connecting holes 41, pivotal holes 42 at a rear end, and holes 43 between the connecting holes 41 and the pivotal holes 42. The connecting plates 4 are each separably connected to a respective one of the end portions of the front support member 1 with the connecting holes 41 engaging the connecting buttons 12 of the front support member 1; the position of the connecting plates 4 relative to the front support member 1 can be adjusted because there are several pairs of connecting holes 41 on the connecting plates 4.

The wheel supports 5 are each connected to a respective one of the side wheel 54. The side wheels 54 each has a handle attached to an inner side between the edge and the center. Referring to FIG. 3, the wheel supports 5 each has holes 52, pivotal holes 51 and screw holes 53.

The wheel supports 5 are each connected to a respective one of the connecting plates 4 with a pivotal pin 511 passed through the pivotal holes 51 and 42 and a connecting pin 521 passed through the holes 52 of the wheel support 5 and the holes 43 of the connecting plate 4; thus, the wheels 54 are securely connected to the front support member 1. Moreover, two support bars 25 are provided; each is connected to one of the screw holes 53 of the respective wheel support 5 from an outer end by means of a screw 531 screwed into the outer end. The support bars 25 are shaped such that a footrest bar 24 can be secured to the inner ends at a suitable position in order for a user to put his feet thereon.

In using the playcart, a user sits on the seat 32 with his feet put on the footrest bar 24, and pushes the handles 541 to roll the wheels 54 forwards; thus, the playcart is moved along.

To adjust the playcart in size in order for same to be suitable for users of different bodily sizes, the connecting plates 4 are connected to the connecting buttons 12 of the front support member 1 from an appropriate one of the connecting holes 41, and the support bars 25 are connected to an appropriate one of the screw holes of the wheel supports 5. And, as have been mentioned earlier, the bolt 311 of the seat member 3 is connected to an appropriate one of the screw holes 231 of the main support member 2.

To fold the playcart for storage, the support bars 25 are first removed from the wheel supports 5, and the connecting pins 521 are separated from the holes 43 and 52. Thus, the wheel supports 5 with the side wheels 54 can be pivoted on the pivotal pins 511 inwardly of the playcart. Furthermore, the seat member 3 can also be separated from the main support member 2 for storage.

From the above description, the playcart movable with hands of the present invention can be know to have desirable as follows:

1. The playcart can be easily folded to a smaller size for storage when not in use.
2. The width of the playcart can be changed by adjusting the position of the connecting plates 4 relative to the front support member 1, and the position can be changed very easily with the connecting buttons 12 of the front support member 1. And, the length of the playcart can be changed by adjusting the position of the seat member 3 relative to the main support member 2.
3. The playcart provides a good exercise for the rider because the rider can use his eyes, brain and hands at the same time, and pushing the handles is like moving oars of a boat.

What is claimed is:

1. A playcart movable with hands, comprising a front support member, said front support member having two end portions bent rearwards; said bent end portions each having a connecting plate pivoted thereto; said front support member having locating tubes projecting from a lower side, each receiving a locating rod projecting from a front end of a main support member connected to a seat member; said main support member having a front wheel fitted thereto; said seat member having a back and a rear wheel fitted thereto; a pair of wheel supports each having a side wheel turnably fitted thereto; said wheel supports being each connected to a respective one of said connecting plates with a pivotal pin passed through pivotal holes thereof and pivotal holes of said respective connecting plates, and with connecting pins passed through holes thereof and holes of said respective connecting plates; said side wheels each having a handle connected to an inner side between a center and an edge thereof; a footrest bar, said footrest bar being secured to said wheel supports; said playcart being capable of being moved along by a user sitting on said seat member and pivoting said handles on axles of said side wheels with hands to turn said side wheels.

2. The playcart movable with hands as claimed in claim 1, wherein said locating tubes of said front support member each has connecting holes, and said locating rods of said main support member each has connecting buttons; said connecting buttons normally projecting from said locating rods to engage said connecting holes of said locating tubes to secure said locating rods to said locating tubes; said connecting buttons being depressable for permitting said locating rods to be separated from said locating tubes.

3. The playcart movable with hands as claimed in claim 1, wherein said main support member has a plurality of screw holes, and said seat member has a bolt passed through same, and screwed into one of said screw holes to secure said seat member to said main support member; said seat member being capable of being changed in position relative to said main support member by means of changing a position of said bolt from one of said screw holes to another.

4. The playcart movable with hands as claimed in claim 1, wherein said bent end portions of said front support member each has two opposing connecting buttons each engaging a connecting hole of said connecting plate; said connecting buttons normally projecting from said bent end portions, and being capable of being depressed for permitting said connecting plates to be separated from said bent end portions, and relocated on said bent end portions from other connecting holes thereof to change position of said conecting plates relative to said front support member.

5. The playcart movable with hands as claimed in claim 1, wherein said connecting pins can be removed from said holes of said connecting plates and said holes of said wheel supports for permitting said wheel supports to be pivoted on said pivotal pins to fold said playcart.

6. The playcart movable with hands as claimed in claim 1, wherein said footrest bar has two shaped support bars each connected to a respective one of said wheel supports from an outer end, and connected to said footrest bar from an inner end; said support bars being capable of being relocated on said wheel supports for changing a position of said footrest bar.

* * * * *